US011216668B2

(12) United States Patent
Bagheri (10) Patent No.: US 11,216,668 B2
(45) Date of Patent: *Jan. 4, 2022

(54) ADDRESSABLE IMAGE OBJECT

(71) Applicant: AT&T Mobility II LLC, Atlanta, GA (US)

(72) Inventor: Manouchehr Bagheri, Northborough, MA (US)

(73) Assignee: AT&T Mobility II LLC, Atlanta, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/845,142

(22) Filed: Apr. 10, 2020

(65) Prior Publication Data

US 2020/0242368 A1 Jul. 30, 2020

Related U.S. Application Data

(63) Continuation of application No. 15/828,607, filed on Dec. 1, 2017, now Pat. No. 10,657,380.

(51) Int. Cl.
*G06K 9/00* (2006.01)
*G06Q 30/02* (2012.01)
(Continued)

(52) U.S. Cl.
CPC ......... *G06K 9/00744* (2013.01); *G06F 16/95* (2019.01); *G06Q 30/0241* (2013.01);
(Continued)

(58) Field of Classification Search
CPC ......... G06K 9/00744; H04N 21/23418; H04N 21/2387; G06F 17/30861; G06Q 30/0271
(Continued)

(56) References Cited

U.S. PATENT DOCUMENTS 5,929,849 A * 7/1999 Kikinis ............ H04N 21/64322
725/113
6,282,713 B1 * 8/2001 Kitsukawa ............. H04H 60/63
725/36

(Continued)

FOREIGN PATENT DOCUMENTS

JP 2002540648 A 11/2002
WO 9712342 A1 4/1997
(Continued)

OTHER PUBLICATIONS

"International Search Report and Written Opinion for PCT/US18/062616", dated Feb. 14, 2019, 12 pages.

(Continued)

*Primary Examiner* — Van D Huynh
(74) *Attorney, Agent, or Firm* — Guntin & Gust, PLC; Mark Wilinski (57) ABSTRACT

Aspects of the subject disclosure may include, for example, analyzing media content to recognize an object therein, wherein the media content is provided as a video stream displayed to a user of a communication device, the media content comprising a plurality of digital frames transported to the communication device over a private network; associating product information of a product with the object; receiving a user input selecting the object; determining providers of goods or services of the product, wherein the providers of goods or services are selected during the determining based on a proximity of the providers to the user of the communication device; and providing the product information to the communication device. Other embodiments are disclosed.

20 Claims, 6 Drawing Sheets

(51) Int. Cl.
*G06F 16/95* (2019.01)
*H04N 21/234* (2011.01)
*H04N 21/2387* (2011.01)

(52) U.S. Cl.
CPC ..... *G06Q 30/0251* (2013.01); *G06Q 30/0256* (2013.01); *G06Q 30/0261* (2013.01); *G06Q 30/0271* (2013.01); *H04N 21/2387* (2013.01); *H04N 21/23418* (2013.01)

(58) Field of Classification Search
USPC .................................................. 382/103
See application file for complete search history.

(56) References Cited

U.S. PATENT DOCUMENTS

| | | | |
|---|---|---|---|
| 6,483,986 | B1 | 11/2002 | Krapf et al. |
| 7,017,173 | B1 | 3/2006 | Jorgensen et al. |
| 7,158,676 | B1 | 1/2007 | Rainsford et al. |
| 7,240,075 | B1 | 7/2007 | Nemirofsky et al. |
| 7,735,101 | B2 | 6/2010 | Lanza et al. |
| 7,899,705 | B2 | 3/2011 | Fuisz et al. |
| 7,933,809 | B2 | 4/2011 | Abraham et al. |
| 8,392,821 | B2 | 3/2013 | DeMarco et al. |
| 8,667,539 | B2 | 3/2014 | Hartson et al. |
| 8,843,959 | B2 | 9/2014 | Isidore et al. |
| 8,922,578 | B2 | 12/2014 | Hunleth et al. |
| 8,937,685 | B1 | 1/2015 | Chiu et al. |
| 9,106,881 | B2 | 8/2015 | Barton et al. |
| 9,173,010 | B2 | 10/2015 | Sussman |
| 9,189,818 | B2 | 11/2015 | McClements, IV et al. |
| 9,351,032 | B2 | 5/2016 | Briggs et al. |
| 9,440,152 | B2 | 9/2016 | Thompson et al. |
| 9,462,309 | B2 | 10/2016 | Kaiser et al. |
| 9,635,438 | B2 | 4/2017 | Mandalia et al. |
| 9,674,584 | B2 | 6/2017 | Briggs et al. |
| 2001/0016835 | A1 | 8/2001 | Hansmann et al. |
| 2002/0056109 | A1 | 5/2002 | Tomsen et al. |
| 2002/0087969 | A1 | 7/2002 | Brunheroto et al. |
| 2002/0112249 | A1 | 8/2002 | Hendricks et al. |
| 2002/0129364 | A1 | 9/2002 | Smith et al. |
| 2002/0184514 | A1* | 12/2002 | Granzer ................. G07F 11/62 713/193 |
| 2003/0135434 | A1* | 7/2003 | Jain ....................... G06Q 30/04 705/34 |
| 2003/0220835 | A1 | 11/2003 | Barnes, Jr. et al. |
| 2005/0097622 | A1 | 5/2005 | Zigmond et al. |
| 2005/0210526 | A1 | 9/2005 | Levy et al. |
| 2009/0083815 | A1* | 3/2009 | McMaster .......... H04N 21/8586 725/110 |
| 2009/0193475 | A1 | 7/2009 | Halverson et al. |
| 2009/0278986 | A1* | 11/2009 | Ikegami ................ H04N 5/278 348/564 |
| 2010/0161441 | A1* | 6/2010 | Hounsell ............ G06Q 30/0601 705/26.1 |
| 2011/0093879 | A1 | 4/2011 | Salkind et al. |
| 2012/0253982 | A1* | 10/2012 | Wright .................. G06Q 30/06 705/27.1 |
| 2013/0019261 | A1 | 1/2013 | Huber et al. |
| 2013/0227622 | A1 | 8/2013 | Landow et al. |
| 2013/0290847 | A1 | 10/2013 | Hooven et al. |
| 2014/0281004 | A1* | 9/2014 | Bridges .............. H04N 21/4622 709/231 |
| 2014/0372210 | A1* | 12/2014 | Watfa ................. G06Q 30/0275 705/14.49 |
| 2015/0026718 | A1 | 1/2015 | Seyller |
| 2015/0213476 | A1* | 7/2015 | Foster ................. G06Q 30/0226 705/14.27 |
| 2015/0245103 | A1* | 8/2015 | Conte ................. G06Q 30/0643 725/60 |
| 2015/0262229 | A1 | 9/2015 | Brenner et al. |
| 2016/0162979 | A1* | 6/2016 | Robinson ........... G06Q 30/0641 705/26.9 |
| 2016/0239907 | A1* | 8/2016 | Dolen ................. G06Q 30/0611 |
| 2017/0060823 | A1 | 3/2017 | Zheng et al. |
| 2017/0308651 | A1* | 10/2017 | Pattni ..................... G06Q 20/40 |
| 2018/0027305 | A1 | 1/2018 | Bagheri et al. |
| 2018/0150868 | A1* | 5/2018 | Stone ..................... G06Q 20/06 |
| 2018/0232766 | A1* | 8/2018 | Braunberger ...... G06Q 30/0255 |
| 2019/0171884 | A1 | 6/2019 | Bagheri |
| 2020/0145730 | A1 | 5/2020 | Bagheri |
| 2021/0204039 | A1 | 7/2021 | Bagheri |

FOREIGN PATENT DOCUMENTS

| | | |
|---|---|---|
| WO | 9847084 A1 | 10/1998 |
| WO | 9900979 A1 | 1/1999 |
| WO | 9910822 A1 | 3/1999 |
| WO | 2001099325 | 12/2001 |

OTHER PUBLICATIONS

"Object-Based Media Group", MIT Media Lab, Jun. 18, 2016, 22 pages.

"XAPP Ads® Give Consumers a Voice", http://web.archive.org/web/20140423023115/http://xappmedia.com/, Discloses interactive audio ads that connect consumers directly with your brand by responding to ads instantly with just their voice, providing convenience for them and conversion for you., Apr. 23, 2014.

McCollin, Rachel, "Making Embedded Content Work in Responsive Design", https://www.smashingmagazine.com/2014/02/making-embedded-content-work-in-responsive-design/, Discloses how to make embedded content responsive using CSS., Feb. 27, 2014.

Mitchell, Perry, "Interacting with overlay elements on mobile HTML5 video", http://perrymitchell.net/article/interacting-with-overlay-elements-on-html5-video/, Discloses using an overlay poster to allow the placement of ads and other objects on top of the video poster., Nov. 19, 2013.

Wales, Tim, "Captivating Open University students with online literature search tutorials created using screen capture software", http://www.emeraldinsight.com/doi/abs/10.1108/00330330810912052, Discloses the use of screen capture software for information literacy purposes in a UK academic library and distance-learning context., 2008.

"Preliminary Report on Patentability", PCT/US2018/062616, dated Jun. 11, 2020, 8 pages.

* cited by examiner

ADDRESSABLE IMAGE OBJECT

CROSS-REFERENCE TO RELATED APPLICATIONS

This application is a Continuation of U.S. patent application Ser. No. 15/828,607 filed on Dec. 1, 2017. All sections of the aforementioned application are incorporated herein by reference in their entirety.

FIELD OF THE DISCLOSURE

The subject disclosure relates to a system and method for linking objects identified in media content with suppliers of goods and services through the Internet.

BACKGROUND

Online advertisers typically target users with advertisements of products or services based on traits or perceived needs of the users. Such advertising is often unreliable because of the uncertainty of prospective purchasers, often based on the use of search words entered by the user to imply interest in acquiring particular goods or services.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a system for identifying and maintaining addressable image objects. Other embodiments are described in the subject disclosure.

One or more aspects of the subject disclosure include a method, comprising: analyzing, by a processing system comprising a processor, media content, wherein the media content is provided as a video stream displayed to a user of a media device, the media content comprising a plurality of digital frames transported to the media device over a private network; recognizing, by the processing system, product information from the analyzing of the plurality of digital frames in the media content; determining, by the processing system, product website information for providers of goods or services associated with the product information, wherein the providers of goods or services are selected during the determining based on a proximity to the user of the media device; receiving, by the processing system from the media device, a user input selecting a product associated with the product information resulting in a selected product; and providing, by the processing system, a connection to a website associated with the selected product to the media device through the private network, wherein the product website information comprises a uniform resource locator to the website, and wherein the website enables the user to securely procure the product selected without providing payment information to the providers of the goods or services.

One or more aspects of the subject disclosure include a device, comprising: a processing system including a processor; and a memory that stores executable instructions that, when executed by the processing system, facilitate performance of operations, the operations comprising: analyzing media content to recognize an object therein, wherein the media content is provided as a video stream displayed to a user of a communication device, the media content comprising a plurality of digital frames transported to the communication device over a private network; associating product information of a product with the object; receiving a user input selecting the object; determining providers of goods or services of the product, wherein the providers of goods or services are selected during the determining based on a proximity of the providers to the user of the communication device; and providing the product information to the communication device.

One or more aspects of the subject disclosure include a non-transitory machine-readable medium, comprising executable instructions that, when executed by a processing system including a processor, facilitate performance of operations, the operations comprising: analyzing media content to recognize an object therein, wherein the media content is provided as a video stream displayed to a user of a communication device, the media content comprising a plurality of digital frames sent to the communication device over a private network; identifying a product from the object; receiving a user input selecting the object on a screen of the communication device; determining a location of the communication device; and providing a list of providers of goods or services of the product to the communication device based an ability of the providers of the goods or services to deliver the goods or services to the location of the communication device in a timely fashion.

Figure 1:
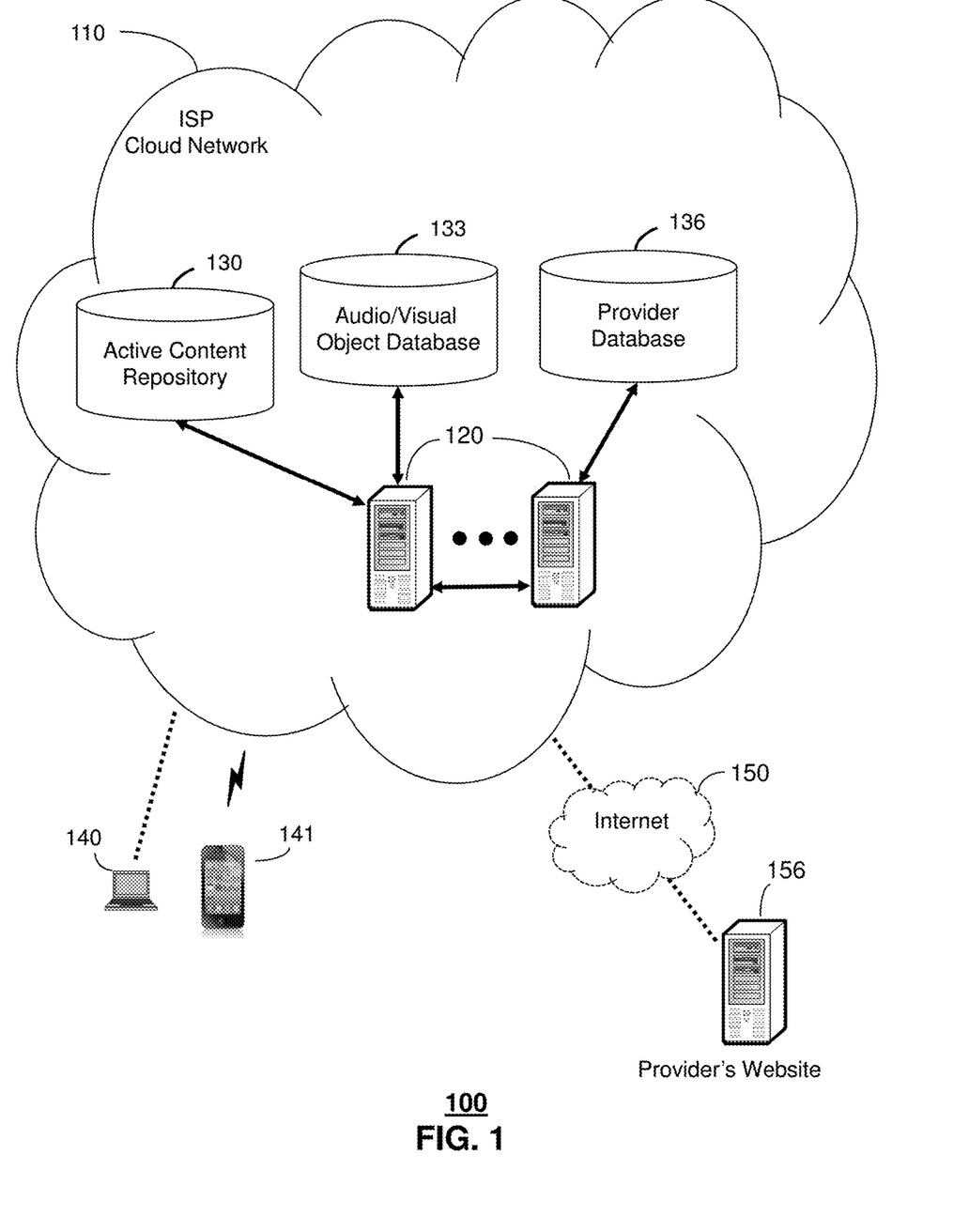
FIG. 1 depicts an illustrative embodiment of system for addressable image objects.

FIG. 1 depicts an illustrative embodiment of system 100 for addressable image objects. System 100 comprises an Internet service provider (ISP) cloud network 110, which is a private, scalable network of servers and databases to and through which internet communication services are provided to wireless and wired communication devices 140, 141. A private network is, for example, a network that is not accessible to the public. Examples of private networks include virtual private networks (VPNs), subscription based networks, encrypted networks, secured networks, or the like. As illustrated in FIG. 1, the ISP cloud network 110 may comprise one or more network servers 120, an active content repository 130, an audio/visual object database 133, and a provider database 136. Also illustrated is the Internet 150 and a provider's website 156. Provider's website 156 may be connected to ISP cloud network 110 through the Internet 150, as illustrated, or directly to ISP cloud network 110 (not shown). Network servers 120 may be virtual servers or hardware servers, as described in further detail below.

System 100 performs automated object recognition and tagging functions to derive objects found in audio, visual, or audiovisual content (collectively, "media content"). The system saves the recognized video and audio objects in audio/visual object database 133. The audio/visual object database 133 can be linked to, supplemented by, or updated by all sources of data including but not limited to providers' inventories or other information stored in the provider database 136.

Active content repository 130 comprises a library of media content requested by communication devices 140, 141. Communication devices 140, 141 provide input to ISP cloud network 110 requesting delivery of media content for play back on communication devices 140, 141. For example, communication device 140 may be a set-top box that tunes to a particular television channel where live media content is presented. Alternatively, communication device 141 may be a mobile device that is being used to watch on demand media content. Further description of communication devices 140, 141 is set forth below in connection with FIG. 6 below.

As the user is watching the media content, the user may wish to seek further information about an addressable image object that the user identifies in the media content. The user indicates such interest as the activated content is being played back on the communication device 140, 141, for example, by activating a spot on the screen that may be responsive to addressable image object selection on the communication device. Such activation may pause playback of the media content. Upon pause, more detailed information and the rest of the tagged addressable image objects will be sent to the user's viewing device. Further description of the user interface may be found in U.S. patent application Ser. No. 15/216,024, entitled "Internet Enabled Video Media Content Stream, filed Jul. 21, 2016, which is incorporated by reference herein in its entirety. When user selects any addressable image object in the paused picture, website links for all providers of that product can appear on the screen in a list that has already been sorted according to criteria. Selecting an addressable image object allows the user to follow a dynamic link provided by the localization process to a web address enabling the user to select one or more vendors that can provide a product associated with the selected addressable image object. Sorting the provider's list for selected addressable image objects can be setup by users based on their interest(s). A default criteria setup might be based on proximity, price, delivery time, service agreement, and so on.

The system 100 notes the location of a user viewing active media content. The system performs a localization process to identify selected providers of all previously tagged addressable image objects in the media content. The system 100 can embed primary information of selected providers based on different criteria such as delivery time, price, and so forth. Primary information of the providers and tagged addressable image objects may be embedded to each active frame or any other frames that have new tagged object(s), compared to previous frames, to save bandwidth. The embedding can be done through inputs from data analysis and big data processes.

During the selection and pausing of the video, network servers 120 in the ISP cloud network 110 may conduct further processing and can send specific and detailed information from the ISP cloud network 110 to the user about recognized addressable image objects in the paused picture. Meanwhile, for example, live media content can be buffered in the device or in the active content repository 130 for viewing continuity, after the information has been provided to the user. The specific and detailed information may be presented to the user, for example, via web pages on the internet 150. Some web pages may be used for commercial purposes, like online ordering. Other web pages may relate to informational entities, such as Wikipedia or the like, providing results to further searches concerning the media content.

Exemplarily, the related webpages are opened in a window. In an embodiment, the related webpages can be provided through the ISP cloud network 110 in a secure environment, such that any order being placed through a website maintained by the provider's website 156, at least because the related webpages that are presented can be controlled by the service provider that provides the media content through the ISP cloud network 110, thereby reducing fraud. Exemplarily, the operator of the ISP cloud network 110 and the user of communication devices 140, 141 already have a preexisting contractual arrangement. Accordingly, the operator can ensure that the user and the provider have established connections in a secure environment of the ISP cloud network 110, because end-to-end connectivity may be wholly provided by the ISP cloud network 110. Exemplarily, the operator can maintain the user's financial information to conduct payment arrangements with the provider of goods and/or services, thus ensuring an extremely secure transaction.

Audio/visual object database 133 comprises addressable image objects recognized in the media content by network servers 120 in the ISP cloud network 110. Fully automated methods of object recognition are performed by the network servers on audio channels and/or frames of a video stream, in real time. The process takes place in the ISP cloud network 110, where the audio/visual object database 133 exists. The audio/visual object database 133 grows continuously through interaction with this process and also other available sources to ISP cloud network 110. Some available image recognition methods can be used to supplement this real time process as follows. Existing computer vision, artificial intelligence, machine learning, and big data methods can be used to analyze and process existing media content and build an infrastructure of the audio/visual object database 133 in the ISP cloud network 110 that can be used for any existing and future application of object recognition. Each object may be identified and categorized to be reachable through different methods like picture or audio matching requests.

In another embodiment, media content can be created having pre-identified addressable image objects attached thereto for inclusion in the active content repository 130. Such media content can be analyzed by providers of goods and/or services that may also be users of the ISP cloud network 110. Information identifying such providers may be stored in the provider database 136. The providers can update either or both of the active content repository 130 or the audio/visual object database 133 with new products for commercial uses. The network servers 120 may determine an association between provider information stored in the provider database 136 and objects stored in the audio/visual object database 133, such as for localization purposes and/or to increase and update the information about products and/or services provided by the providers.

Metadata is stored in the active content repository 130 that associates addressable image objects recognized in the media content with the media content itself. Additionally, each recognized addressable image object in the media content can be tagged by a process that allocates the closest area in a picture occupied by the addressable image object. This area may be used at the communication device to select the addressable image object from among other available objects. Tagging should be done in a way that not only be selectable by the device like touch screen or cursor, but also be able to contain all other required information about provider and alternative or additional options. Alternatively or additionally, the previously described metadata may be stored in the audio/visual object database 133.

Figure 2:
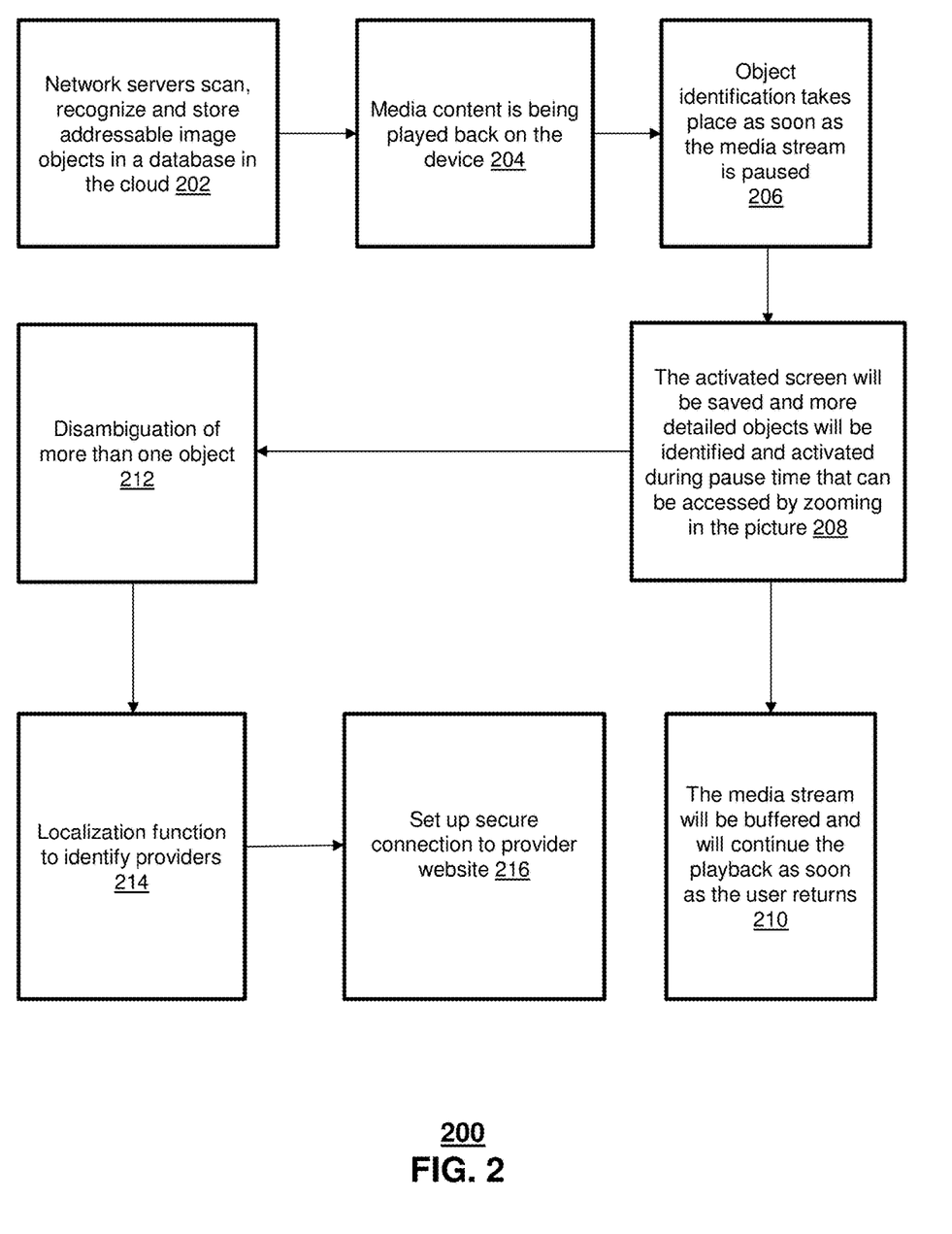
FIG. 2 depicts an illustrative embodiment of a method used in portions of the system described in FIG. 1.

FIG. 2 depicts an illustrative embodiment of a method used by system 100 described in FIG. 1. In step 202, a database of recognized objects is created by network servers in the cloud that scan the media content. In one embodiment, the network servers recognize objects by analyzing the audio channels of the media content, through voice recognition, digital audio watermarks, or the like. In another embodiment, the network servers recognize objects by analyzing the closed captioning provided with the media content. In another embodiment, the network servers recognize objects by image recognition, artificial intelligence, machine learning, or big data methods to analyze and process the media content. In an embodiment, the recognized objects are added to an audio/visual object database located in a private cloud network as addressable image objects. Each addressable image object added can be identified and categorized for use with different methods like picture or audio matching requests. In an embodiment, media content providers may provide object identification information for addressable image objects found within the media content, such as uniform product codes (UPC), offset time stamps, relative positions in the display of the media content, type of advertisement or merchant, the type of product, type of service, as well as definitions of objects, such as images of actors, products, points of interest, etc.

Step 204 illustrates that media content is being played back on a communication device. During playback, network servers continue to recognize objects, as described above. In step 206, the user indicates a desire to obtain more information about an addressable image object observed in the media content. The user can make this indication merely by pressing pause on a remote control, using a pointing device and clicking on the addressable image object, touching a touch screen on the addressable image object, issuing a voice command, or the like. In an embodiment, tagged areas with attached links can be activated by adding information to those area about the user's device and make the area to be responsive to selection method of the device. For example if the communication device has a touch screen, the tagged area indicating a relative location on the screen that should be responsive to a touch. Similarly, for voice activated devices, TV sets, or computer devices that are responsive to different inputs, the displayed content should be responsive to any or all of those methods.

In step 208, the network servers in the cloud may identify the particular frame of the media content selected by the user, and can perform further analysis to identify objects within the frame, or within the preceding series of frames or audio channels. Meanwhile, in step 210, the media stream can be buffered and restarted once the user has completed any activity associated with the object identification.

In step 212, object disambiguation takes place. Here, the system determines whether the user has unambiguously selected a particular addressable image object, or generally has paused display of the media content. The system may provide the communication device with a menu for selection of addressable image objects associated with the media content before the user paused the content. For example, the user may be presented with an option to zoom in on an object or zoom out from an addressable image object to assist in selection of the addressable image object. In an embodiment, the selection may also include disambiguation of the user's interaction with the addressable image object. For example, the object may be a point of interest, such as golf course, and the user may merely want more information about the addressable image object, in which case the system may provide a webpage comprising information associated with the addressable image object. Alternatively, the user may wish to purchase goods or services associated with the addressable image object, in which case the system may arrange for a secure transaction, as set forth in more detail below.

Next, in step 214, network servers in the cloud identify one or more providers of goods or services associated with the addressable image object capable of providing the goods or services in a timely fashion. In one embodiment, the location of the user, which is known to the ISP, can be used to draw an association between the user and providers of goods or services that can effect delivery of the goods or services to the premises of the user within 24 hours. For example, network servers in the cloud may select one or more providers of the goods or services associated with the identified addressable image object based on proximity to the user, and thus, their ability to rapidly provide the goods or services. Such selection, hereinafter known as localization, can be easily made using the information stored in the provider database, and a provider association with the addressable image object stored in the audio/visual object database. The localization process can take place for the broadcast video contents, but will be distributed to users of each area with the related information specific to that area. In an embodiment, the localization process analyzes, selects, and prioritizes the goods and services providers that should be identified to users based on different considerations. For example, the exact producer of the selected addressable image object may be the best choice, but if that producer is not available, to select a provider that has service agreement with the ISP that can provide the product in a secure transaction. The location of the user will be sent and updated by the ISP to the cloud for the localization process. The localization process may use the user's location to identify the providers of all previously tagged objects in the media content being viewed by the user. The providers' information of tagged objects in the video content can be identified by the localization process. In an embodiment, selected providers may compete to be targeted by user for selected product. In an embodiment, the user is presented with a choice of providers of the goods and/or services associated with the selected object. Such choice may be made based on preferred criteria, such as price, delivery time, etc. In another embodiment, the system highlights or emphasizes providers who can effect local delivery quickly.

Once a provider is selected, a new, secure connection to the provider's website can be established on the display of the communication device in step 216. In an embodiment, each addressable image object in the media content can be linked to a web address of the service/product provider that was identified through the localization process. Options may be presented to the user to choose any provider of same product based on different criteria that will also be available as soon as the customer pauses and selects an addressable image object in the picture.

In an embodiment, the primary information of the selected providers and selected tagged addressable image objects may be embedded to each active frame based on different criteria such as delivery time, price, and so on. Embedded addressable image objects may save bandwidth when the system transmits the information of addressable image objects that have a higher chance of selection by a user. A determination of the likelihood of selection of a particular addressable image object can be performed by the system through inputs from data analysis and big data processes that analyze information about the user and user behavior, historical information, demographics, or the like.

In an embodiment, when user selects any addressable image object in the paused picture, website links for all providers of that product can appear on the screen. In an embodiment, the links can be sorted via different criteria than the selection criteria. Sorting the provider list for selected addressable image objects can be setup by users based on their interest. The default criteria setup might be based on proximity, price, delivery time, service agreement, and so on.

In an embodiment, the ISP acts as a clearing house to securely consummate the transaction. In more detail, the ISP can provide the order and delivery instructions to the provider selected by the user, and will remit payment on behalf of the user to the provider. In turn the ISP can add the cost of the purchased goods or services to periodic billing of the user. In this manner, the ISP in effect has extended credit to the user, and acts as a guarantor of payment to the provider. In an embodiment, the user does not need to supply payment information to the provider of the goods and/or services, thus further enhancing the security of the transaction.

Upon completion of the transaction, the communication device can revert to displaying the media content.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
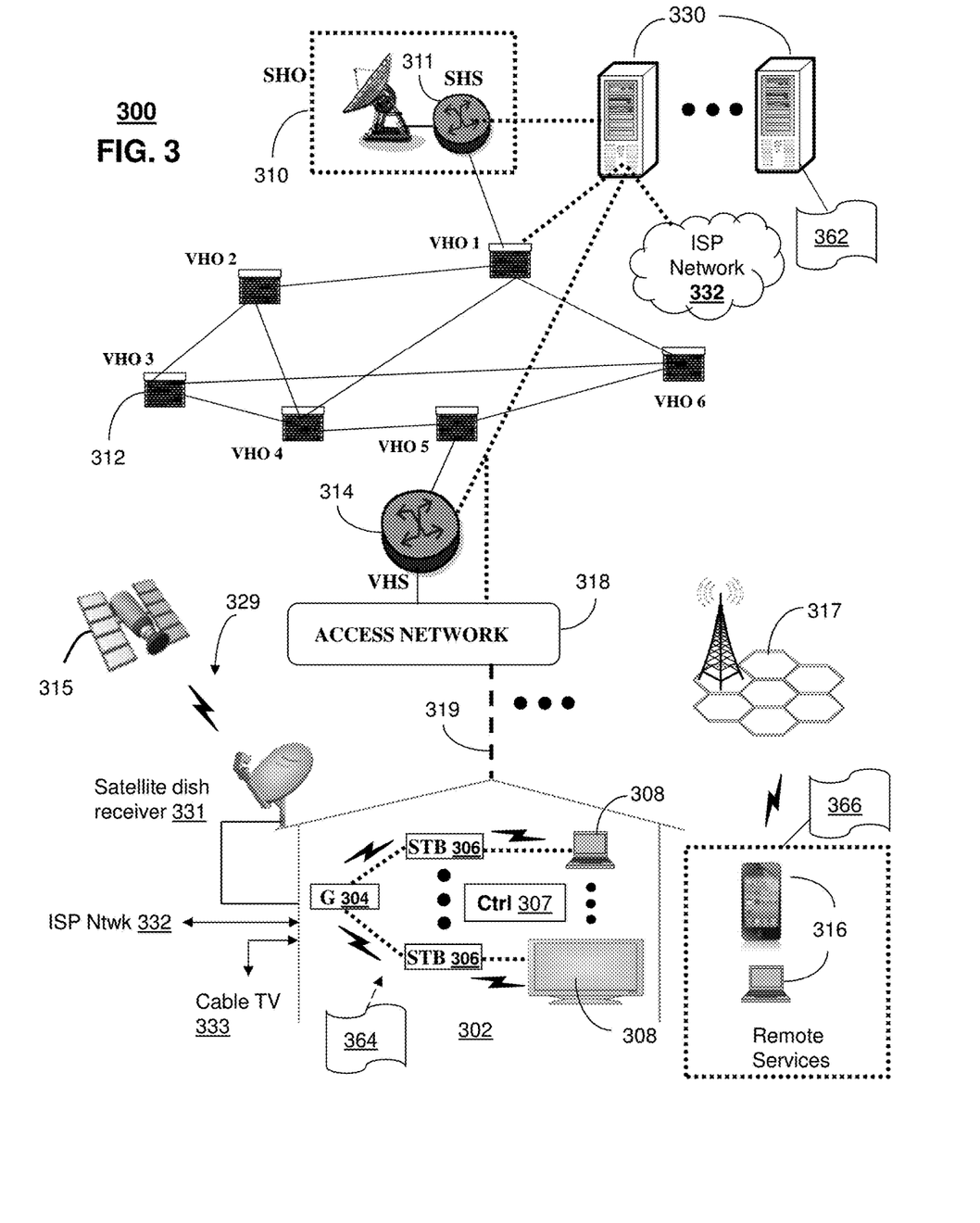
FIGS. 3-4 depict illustrative embodiments of communication systems that provide media services in a system for addressable image objects.

FIG. 3 depicts an illustrative embodiment of a communication system 300 for providing various communication services, such as delivering media content. The communication system 300 can represent an interactive media network, such as an interactive television system (e.g., an Internet Protocol Television (IPTV) media system). Communication system 300 can be overlaid or operably coupled with system 100 illustrated in FIG. 1 as another representative embodiment of communication system 300. For instance, one or more devices illustrated in the communication system 300 of FIG. 3 can perform a method of analyzing media content, wherein the media content is provided as a video stream displayed to a user of a media device, the media content comprising a plurality of digital frames transported to the media device over a private network; recognizing product information from the analyzing of the plurality of digital frames in the media content; determining product website information for providers of goods or services associated with the product information, wherein the providers of goods or services are selected during the determining based on a proximity to the user of the media device; receiving a user input selecting a product associated with the product information resulting in a selected product; and providing a connection to a website associated with the selected product to the media device through the private network, wherein the product website information comprises a uniform resource locator to the website, and wherein the website enables the user to securely procure the product selected without providing payment information to the providers of the goods or services.

In one or more embodiments, the communication system 300 can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol. The VHS 314 can distribute multimedia broadcast content via an access network 318 to commercial and/or residential buildings 302 housing a gateway 304 (such as a residential or commercial gateway).

The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. Communication system 300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as network servers (herein referred to as network servers 330). The network servers 330 can use computing and communication technology to perform function 362, which can include among other things, the cloud object recognition techniques described by method 200 of FIG. 2. For instance, function 362 of server 330 can be similar to the functions described for network servers 120 of FIG. 1 in accordance with method 200. The media processors 306 and wireless communication devices 316 can be provisioned with software functions 364 and 366, respectively, to utilize the services of network servers 330. For instance, functions 364 and 366 of media processors 306 and wireless communication devices 316 can be similar to the functions described for the communication devices 140, 141 of FIG. 1 in accordance with method 200.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
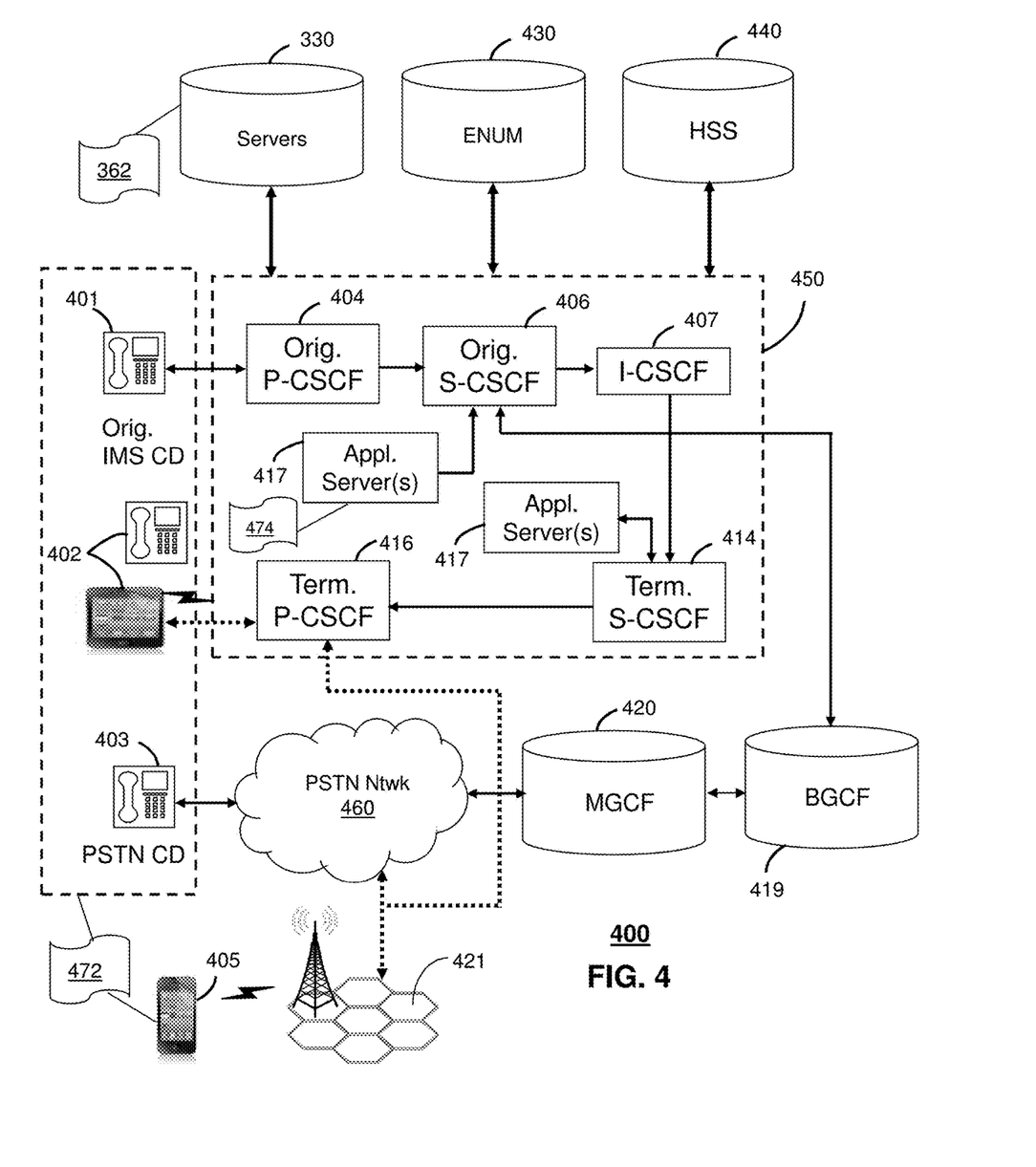

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 and communication system 300 as another representative embodiment of communication system 300. Communication system 400 can perform one or more steps of a method of analyzing media content, wherein the media content is provided as a video stream displayed to a user of a media device, the media content comprising a plurality of digital frames transported to the media device over a private network; recognizing product information from the analyzing of the plurality of digital frames in the media content; determining product website information for providers of goods or services associated with the product information, wherein the providers of goods or services are selected during the determining based on a proximity to the user of the media device; receiving a user input selecting a product associated with the product information resulting in a selected product; and providing a connection to a website associated with the selected product to the media device through the private network, wherein the product website information comprises a uniform resource locator to the website, and wherein the website enables the user to securely procure the product selected without providing payment information to the providers of the goods or services.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The network servers 330 of FIG. 4 can be operably coupled to communication system 400 for purposes similar to those described above. Network servers 330 can perform function 362 and thereby provide addressable image object selection services to the CDs 401, 402, 403 and 405 of FIG. 4 similar to the functions described for system 100 of FIG. 1 in accordance with method 200 of FIG. 2. CDs 401, 402, 403 and 405, which can be adapted with software to perform function 472 to utilize the services of the network servers 330 similar to the functions described for communication devices 140, 141 of FIG. 1 in accordance with method 200 of FIG. 2. Network servers 330 can be an integral part of the application server(s) 417 performing function 474, which can be substantially similar to function 362 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
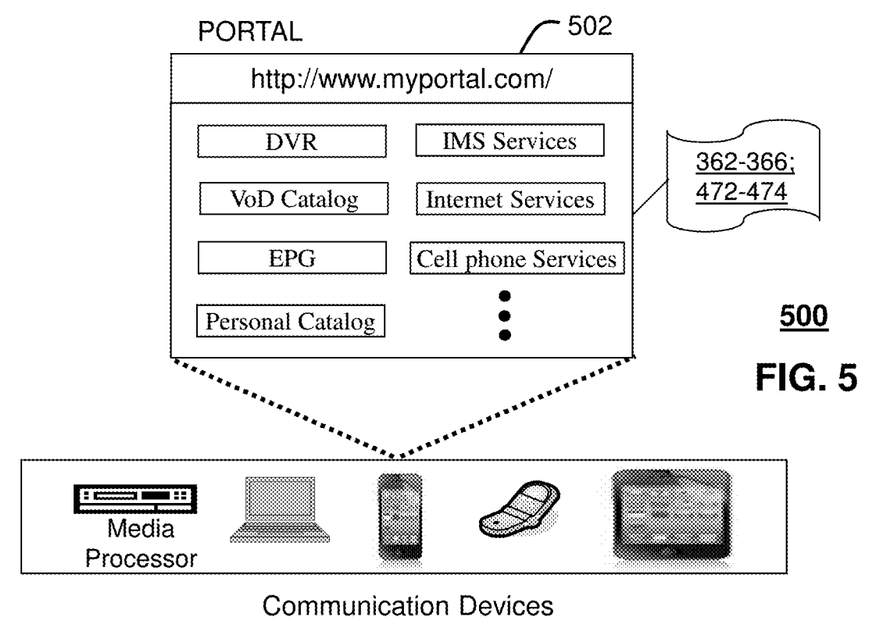
FIG. 5 depicts an illustrative embodiment of a web portal for interacting with the communication systems of FIGS. 1 and 3-4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of system 100 of FIG. 1, communication system 300, and/or communication system 400. The web portal 502 can be used for managing services of system 100 of FIG. 1 and communication systems 300 and/or 400. A web page of the web portal 502 can be accessed by a Uniform Resource Locator (URL) with an Internet browser using an Internet-capable communication device, such as those described in FIG. 1 and FIGS. 3-4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1, and communication systems 300 and/or 400. For instance, users of the services provided by network servers 120 or network servers 330 can log into their on-line accounts and provision the network servers 120 or network servers 330 with profile information describing preferences for producers or defaults for actions taken when selecting addressable image objects, provide contact information to server to enable it to communication with communication devices described in FIG. 1, providing user defined criteria for arranging potential producers, and so on. Service providers can log onto an administrator account to provision, monitor and/or maintain the system 100 of FIG. 1 and/or network servers 330.

Figure 6:
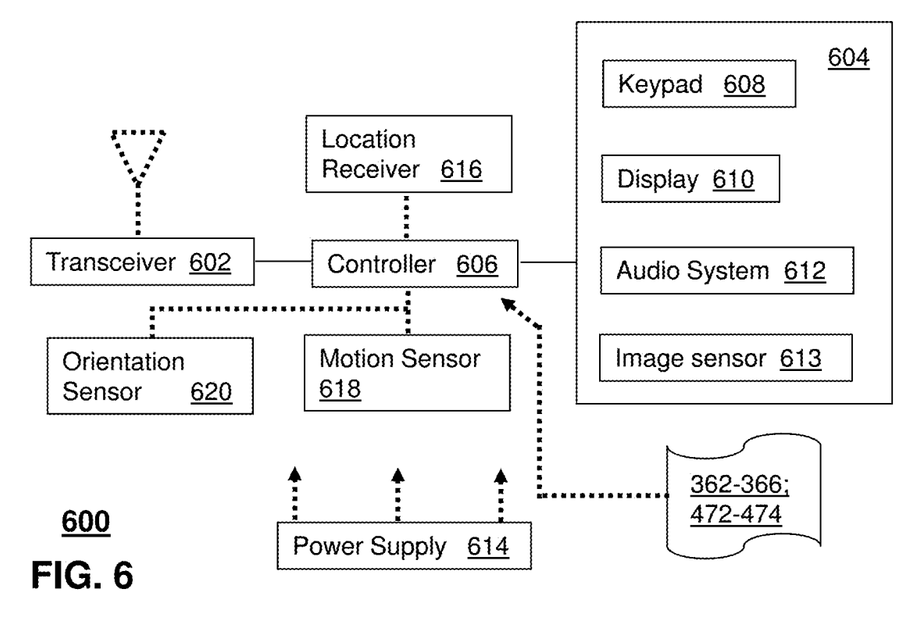
FIG. 6 depicts an illustrative embodiment of a communication device.

FIG. 6 depicts an illustrative embodiment of a communication device 600. Communication device 600 can serve in whole or in part as an illustrative embodiment of the communication devices 140, 141 depicted in FIG. 1, and FIGS. 3-4 and can be configured to perform portions of method 200 of FIG. 2.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of communication devices 140, 141 of FIG. 1, the media processor 306, the media devices 308, or the portable communication devices 316 of FIG. 3, as well as the IMS CDs 401-402 and PSTN CDs 403-405 of FIG. 4. It will be appreciated that the communication device 600 can also represent other devices that can operate in system 100 of FIG. 1, communication systems 300-400 of FIGS. 3-4 such as a gaming console and a media player. In addition, the controller 606 can be adapted in various embodiments to perform the functions 362-366 and 472-474, respectively.

Upon reviewing the aforementioned embodiments, it would be evident to an artisan with ordinary skill in the art that said embodiments can be modified, reduced, or enhanced without departing from the scope of the claims described below. For example, the system may identify providers of goods or services that could effect delivery of the products in a very short time, for example, within an hour or two of order placement. In another example, an automated interactive process between system 100 of FIG. 1 and subscribed providers enables a bidding process among providers for a selected object. Providers can submit their offers for the associated product to the customer in near real time. For example, the providers can compete on price, delivery time, and services that can offer for the selected product by the customer. The associated product can be represented by any object in the paused picture of the video stream or an image of a product that was taken by the user or a real time video in an Augmented Reality (AR) environment pointing to an object that customer is interested in. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
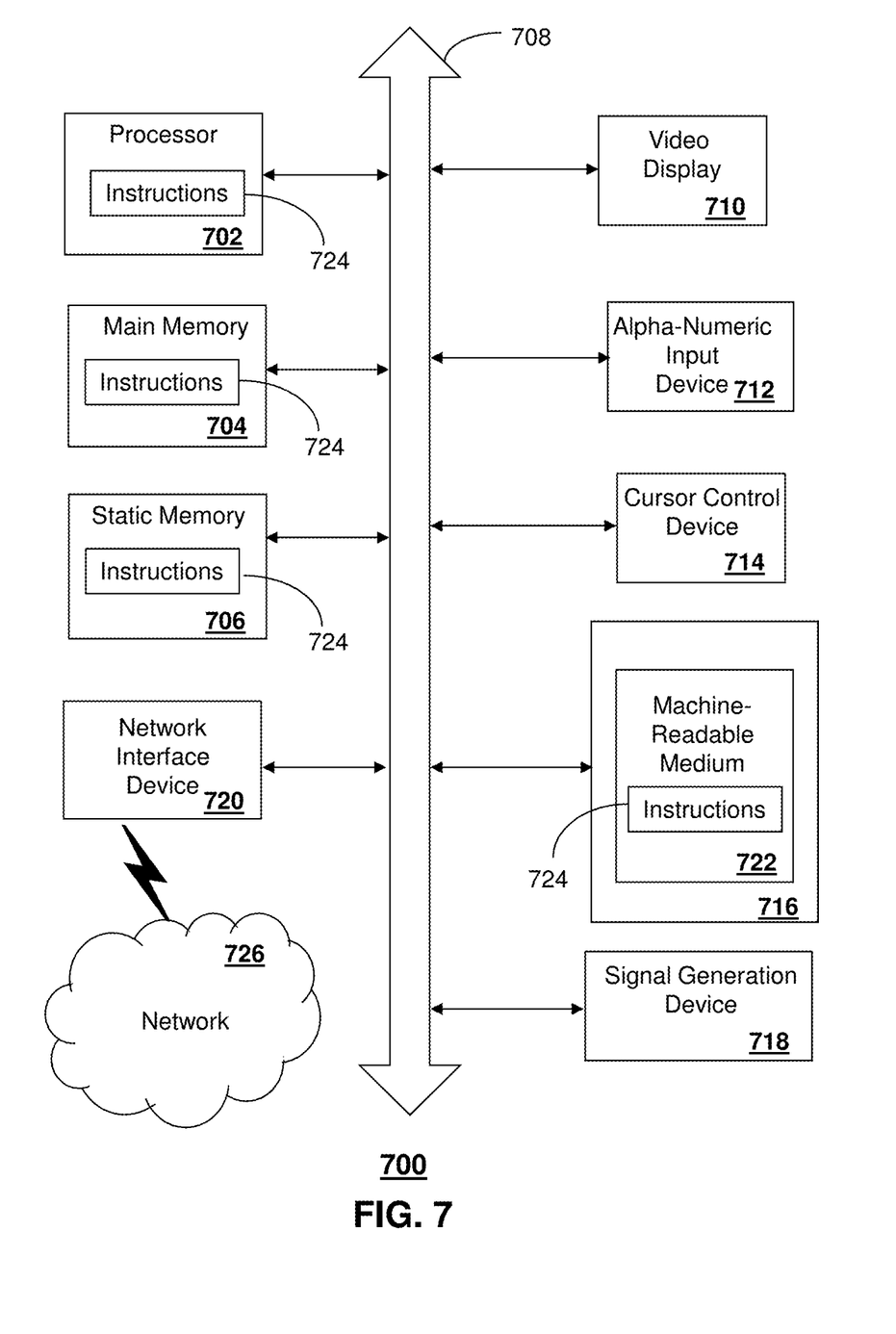
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as network servers 330, the media processor 306, the network servers 120, active content repository 130, audio/visual object database 133, provider database 136, provider's website 156, communication devices 140-141, ISP cloud network 110, and other devices of FIGS. 1 and 3-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
analyzing, by a processing system comprising a processor, closed captioning provided with media content, the media content being provided to a media device;
recognizing, by the processing system, product information, the recognizing being based on the analyzing of the closed captioning;
receiving, by the processing system from the media device, an input selecting a product associated with the product information, the selecting resulting in a selected product; and providing, by the processing system, a connection to a website associated with the selected product to the media device.

2. The method of claim 1, wherein the website enables a user of the media device to securely procure the selected product by having the selected product being paid for without providing payment information by the user to a first provider of the selected product.

3. The method of claim 2, further comprising:
determining, by the processing system, information for providers of the selected product, wherein the providers are selected during the determining based on a proximity to the media device, and wherein the first provider is included in the providers.

4. The method of claim 1, wherein the media content comprises a plurality of digital frames transported to the media device over a private network.

5. The method of claim 4, wherein the connection to the website is provided to the media device through the private network.

6. The method of claim 1, further comprising creating and storing, by the processing system, an object, wherein the object includes the product information.

7. The method of claim 6, wherein the object includes information identifying a spot on a screen of the media device that is responsive to selecting the object.

8. The method of claim 6, further comprising embedding, by the processing system, the object in the media content.

9. The method of claim 1, further comprising providing, by the processing system, website links for a list of providers of the selected product.

10. The method of claim 9, wherein the list of providers is arranged according to a user defined criteria.

11. The method of claim 1, wherein an operator of the processing system remits payment on behalf of a user of the media device for the selected product.

12. The method of claim 11, wherein the operator of the processing system adds a cost of the payment remitted to a bill of the user.

13. The method of claim 11, wherein the operator of the processing system acts as a guarantor for the user.

14. A device, comprising:
a processing system including a processor; and
a memory that stores executable instructions that, when executed by the processing system, facilitate performance of operations, the operations comprising:
analyzing closed captioning provided with media content to recognize an object in the media content;
associating product information of a product with the object;
receiving an input selecting the object; and
providing the product information to a communication device, the product information comprising a uniform resource locator to a website associated with the product.

15. The device of claim 14, wherein the device comprises a plurality of processors, wherein the plurality of processors comprises the processor and at least another processor, and wherein the plurality of processors operate in a distributed processing environment.

16. The device of claim 14, wherein the media content is provided as a video stream to the communication device.

17. The device of claim 14, wherein a connection between the website and the communication device is made through a private network.

18. The device of claim 14, wherein the operations further comprise:
determining a provider that can provide the product within 24 hours, wherein the website is associated with the provider.

19. A non-transitory machine-readable medium, comprising executable instructions that, when executed by a processing system including a processor, facilitate performance of operations, the operations comprising:
analyzing closed captioning provided with media content to recognize an object in the media content, the media content being provided to a communication device;
identifying a product from the object;
receiving a user input selecting the object on a screen of the communication device; and
based on the receiving of the user input, providing a link to a website to the communication device, the link enabling the user of the communication device to complete a transaction to procure the product.

20. The non-transitory machine-readable medium of claim 19, wherein the operations further comprise:
determining a location of the communication device;
determining providers of the product that can effect delivery of the product to a user of the communication device within 24 hours based on the location; and
providing a list of the providers to the communication device.

* * * * *